United States Patent
Yoshii et al.

(10) Patent No.: US 10,525,862 B2
(45) Date of Patent: Jan. 7, 2020

(54) VEHICLE

(71) Applicant: Yamaha Motor Power Products Kabushiki Kaisha, Shizuoka (JP)

(72) Inventors: Yoshinori Yoshii, Shizuoka (JP); Haruhito Takahashi, Shizuoka (JP)

(73) Assignee: Yamaha Motor Power Products Kabushiki Kaisha, Shizuoka-ken (JP)

( * ) Notice: Subject to any disclaimer, the term of this patent is extended or adjusted under 35 U.S.C. 154(b) by 136 days.

(21) Appl. No.: 15/868,936

(22) Filed: Jan. 11, 2018

(65) Prior Publication Data

US 2018/0257691 A1 Sep. 13, 2018

(30) Foreign Application Priority Data

Mar. 8, 2017 (JP) .................................. 2017-044049

(51) Int. Cl.
*B60N 3/02* (2006.01)
*B60W 30/00* (2006.01)
*B62D 1/04* (2006.01)
*G05D 1/00* (2006.01)

(52) U.S. Cl.
CPC .............. *B60N 3/02* (2013.01); *B60W 30/00* (2013.01); *B62D 1/04* (2013.01); *G05D 1/0061* (2013.01)

(58) Field of Classification Search
CPC ... B60N 3/02; B62D 1/28; B62D 1/04; G05D 1/0061; B60W 30/00
See application file for complete search history.

(56) References Cited

U.S. PATENT DOCUMENTS

| | | | | |
|---|---|---|---|---|
| 3,368,422 A | * | 2/1968 | Walter | B62D 1/04 74/493 |
| 9,610,977 B2 | | 4/2017 | Watanabe et al. | |
| 2018/0334183 A1 | * | 11/2018 | Beauregard | B62D 1/06 |

FOREIGN PATENT DOCUMENTS

| | | | | |
|---|---|---|---|---|
| DE | 19625966 A1 | * | 1/1998 | ............... B60K 37/06 |
| DE | 102008027330 B3 | * | 1/2010 | ............... B62D 1/04 |
| DE | 102010055589 A1 | * | 6/2012 | ............... B62D 1/04 |
| FR | 3043048 B1 | * | 10/2018 | ............... B62D 1/04 |
| JP | H07-061356 A | | 3/1995 | |
| JP | 2016-107717 A | | 6/2016 | |
| JP | 3204508 U | | 6/2016 | |
| WO | WO-2007043072 A1 | * | 4/2007 | ............... B62D 1/04 |

* cited by examiner

*Primary Examiner* — Ruth Ilan
(74) *Attorney, Agent, or Firm* — HEA Law PLLC (57) ABSTRACT

A vehicle includes a fixed member. The fixed member includes a grip portion located adjacent to (in the vicinity of) the steering wheel. The grip portion extends from the lower side to the upper side of the steering wheel when the steering wheel is viewed in the direction along the rotation shaft of the steering wheel. Also, the steering wheel is rotatable independently of the fixed member. According to this vehicle, the driver can react instantly to the shift to the manual operation mode.

8 Claims, 9 Drawing Sheets

VEHICLE

CROSS-REFERENCE TO RELATED APPLICATION

The present application claims priority from Japanese application JP 2017-044049 filed on Mar. 8, 2017, the entire content of which is hereby incorporated by reference into this application.

BACKGROUND

1. Field of the Invention

This invention relates to a vehicle having an automatic operation mode and a manual operation mode as control modes.

2. Description of the Related Art

Some conventional vehicles have an automatic operation mode and a manual operation mode as control modes thereof. The vehicle disclosed in Japanese Patent Application Laid-Open No. H07-061356A has a grab bar positioned in front of the driver's seat and extending in the left-right direction of the vehicle. When the automatic operation mode is selected, the driver can stabilize the posture of the driver's body by grasping the grab bar. As a result, comfortable driving is realized.

SUMMARY

The grab bar extending in the left-right direction disclosed in Japanese Patent Application Laid-Open No. H07-61356 has a problem that it is difficult for the driver to immediately grasp the steering wheel at the moment when the control mode is switched from the automatic operation mode to the manual operation mode.

To address these drawbacks, the present application proposes a vehicle that has the automatic operation mode and the manual operation mode and enables the driver to immediately react for shifting to the manual operation mode.

According to one embodiment, a vehicle includes a front wheel, a rear wheel, and a steering wheel rotatable around a rotation shaft and operated by a driver for steering the front wheel. The vehicle includes a controller having, as control modes thereof, an automatic operation mode in which the front wheel is steered with an actuator and a manual operation mode in which the front wheel is steered according to the operation of the steering wheel by the driver. The vehicle includes a fixed member having a grip portion located in adjacent to the steering wheel. The steering wheel is rotatable independently of the fixed member, and at least a part of the grip portion extends from a position adjacent to a lower side of the steering wheel toward a position adjacent to an upper side of the steering wheel when the steering wheel is viewed in the direction along the rotation shaft. This vehicle enables the driver to smoothly and reliably move the hand holding the grip portion to the steering wheel to grasp the steeling wheel. As a result, the driver can immediately react for shifting to the manual operation mode.

The part of the grip portion may be curved along the steering wheel, which enables the driver to more smoothly move the hand holding the grip portion to the steering wheel to grasp the steering wheel.

At least the part of the grip portion is partially or entirely located outward of the steering wheel in a radial direction of the steering wheel when the steering wheel is viewed in the direction along the rotation shaft, which enables the driver to find the position of the grip portion easily to grasp the grip portion smoothly.

The position of the grip portion in the direction along the rotation shaft may be closer to the front wheel than that of the steering wheel in a side view of the vehicle, which can prevent the grip portion from interfering with the steering operation of the driver in the manual operation mode.

The grip portion and the steering wheel may have a space formed therebetween. This space can prevent the grip portion from interfering with the steering operation of the driver in the manual operation mode.

The fixed member may be attached to a holder that rotatably supports the rotation shaft of the steering wheel. The attachment structure of the fixed member can increase the distance between the position of the fixed member and the driver's legs and thus prevent the fixed member from interfering with the driver.

The fixed member may include, as the grip portion, a right grip portion located further rightward than the rotation shaft of the steering wheel and a left grip portion located further leftward than the rotation shaft of the steering wheel, and when the steering wheel is viewed in the direction along the rotation shaft, a lower end of the right grip portion and a lower end of the left grip portion may have a space formed therebetween. This structure can prevent the grip portions from interfering with the driver.

The vehicle may further include an operating lever supported by a support mechanism adjacent to the rotation shaft of the steering wheel and extending from the support mechanism in a radial direction of the steering wheel. The grip portion may not intersect with the operating lever when the steering wheel is viewed in the direction along the rotation shaft of the steering wheel. This structure can prevent the grip portion from interfering with the operation of the operating lever by the driver.

The steering wheel may rotate according to steering of the front wheel in the automatic operation mode. According to this structure, the driver can stabilize the driver's own posture by gripping the grip portion during the traveling in the automatic operation mode.

BRIEF DESCRIPTION OF THE DRAWINGS

The above and other objects and advantages will be more apparent from the following description and drawings in which.

DETAILED DESCRIPTION

The terminology used herein is for the purpose of describing particular embodiments only and is not intended to be limiting of the invention. As used herein, the term "and/or" includes any and all combinations of one or more of the associated listed items. As used herein, the singular forms "a,"0 "an," and "the" are intended to include the plural forms as well as the singular forms, unless the context clearly indicates otherwise. It will be further understood that the terms "comprises" and/or "comprising," when used in this specification, specify the presence of stated features, processes, steps, operations, elements, and/or components, but do not preclude the presence or addition of one or more other features, processes, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the contest of the relevant art and the present disclosure and will not be interpreted in an idealized or overly formal sense unless expressly so defined herein.

In describing the invention, it will be understood that several designs are disclosed. Each of these designs has individual benefits and each can also be used in conjunction with one or more, or in some cases all, of the other disclosed designs. Accordingly, for the sake of clarity, this description will refrain from repeating every possible combination of the individual designs in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing embodiments.

Figure 1:
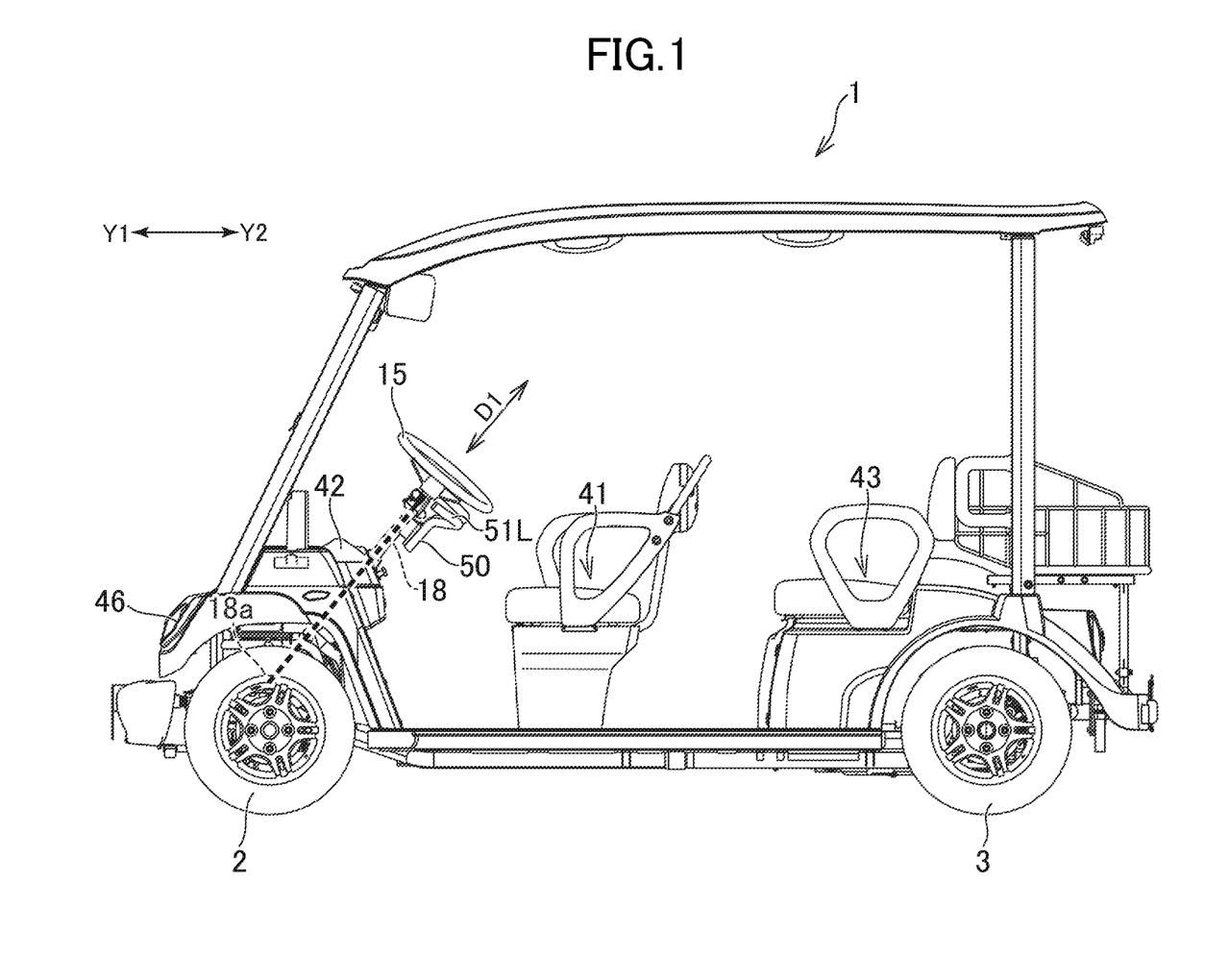
FIG. 1 is a side view of a vehicle described in several embodiments.
Figure 2:
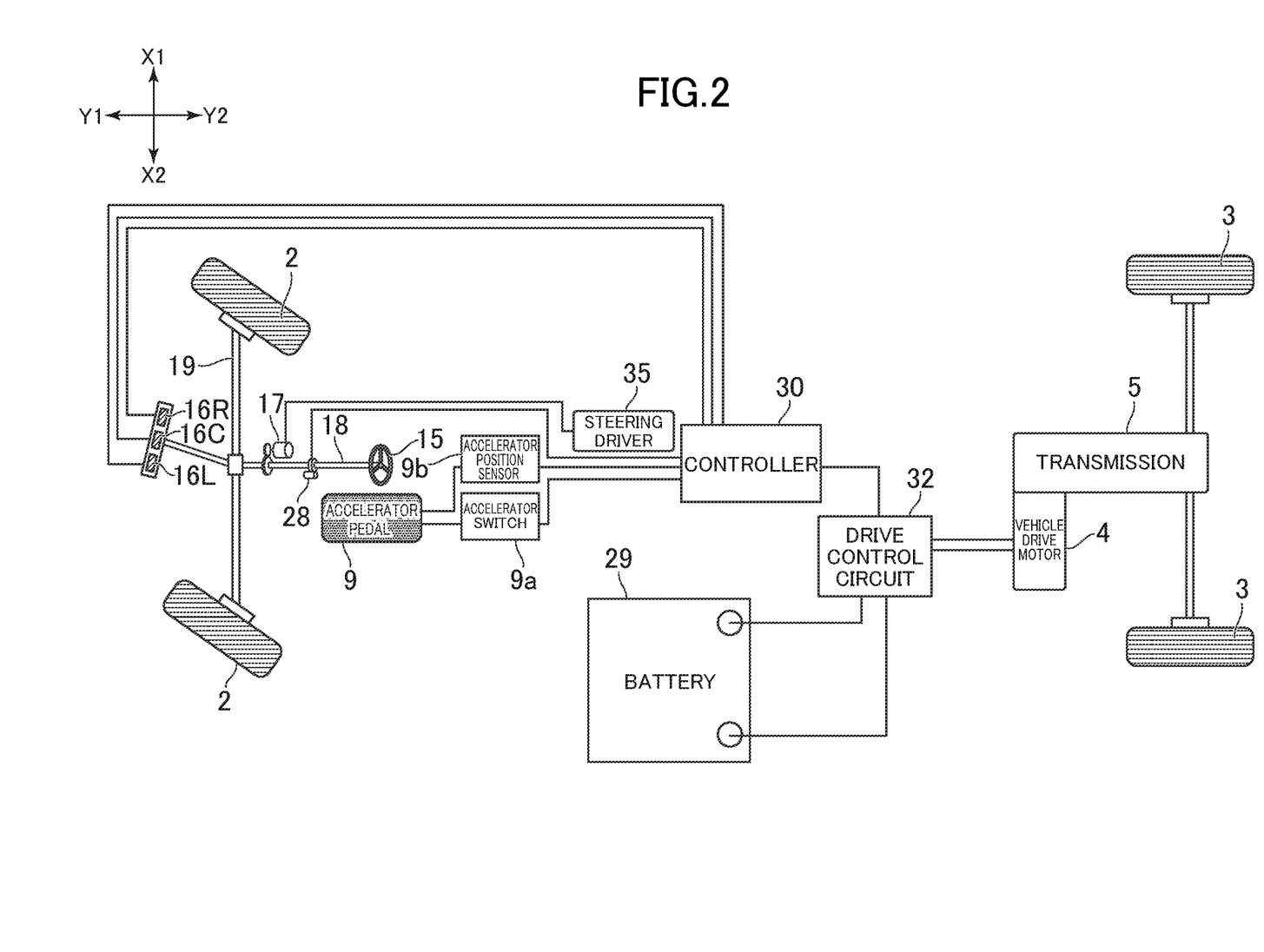
FIG. 2 is a diagram showing a system configuration of the vehicle shown in FIG. 1.
Figure 3:
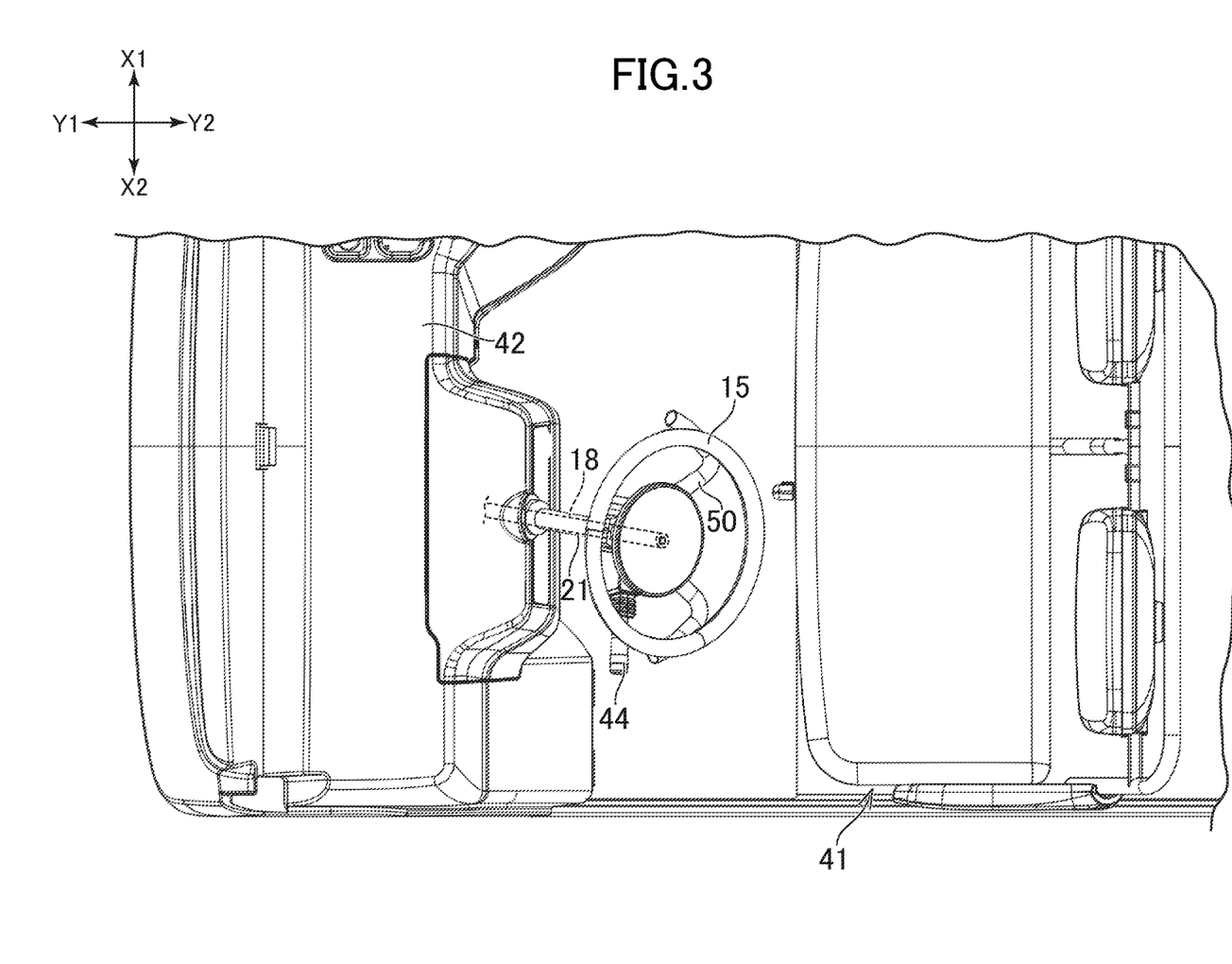
FIG. 3 is a plan view of a region in which a steering wheel is located.
Figure 4:
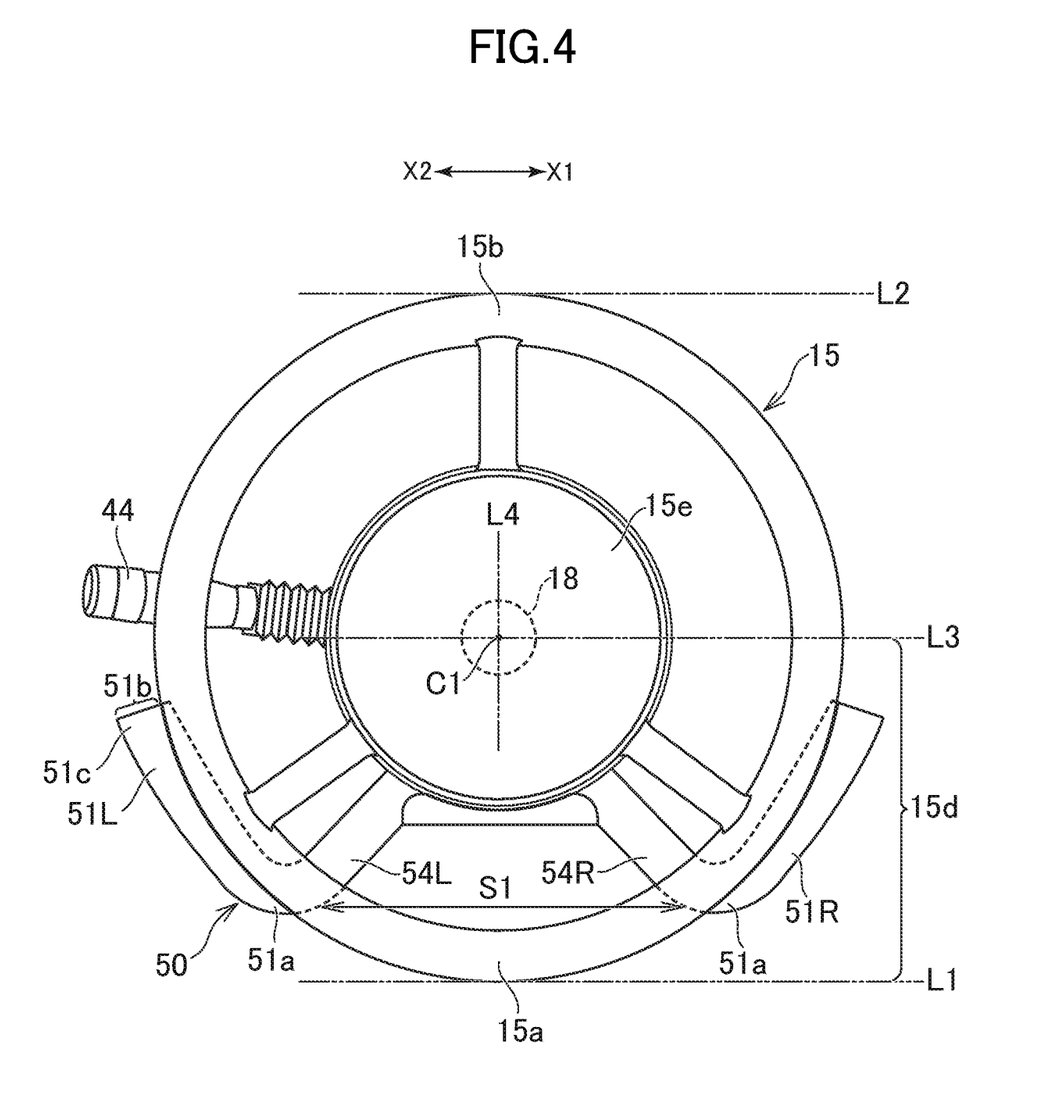
FIG. 4 illustrates the steering wheel and a fixed member viewed in a direction along the rotation shaft of the steering wheel.
Figure 5:
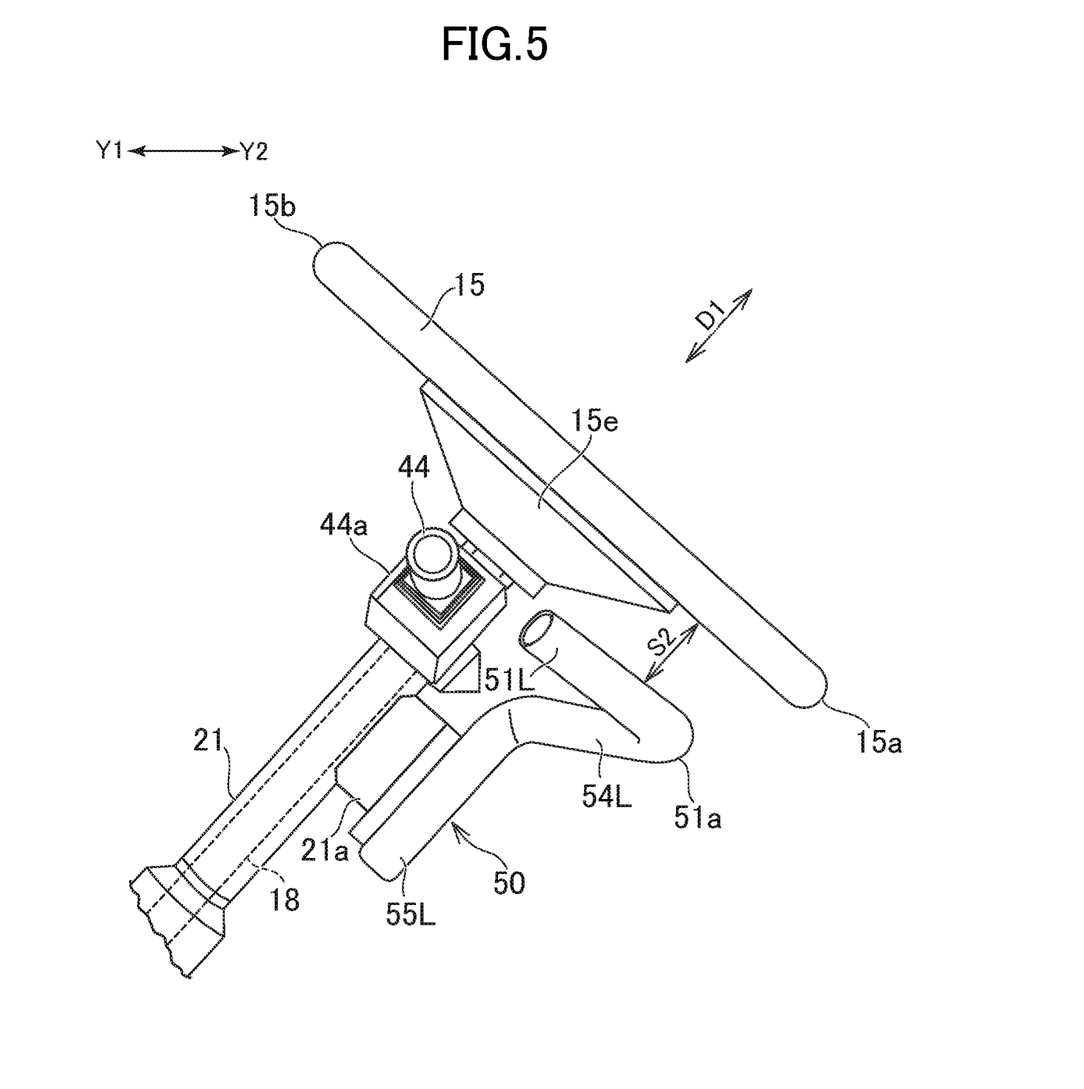
FIG. 5 is a side view of the steering wheel and the fixed member.
Figure 6:
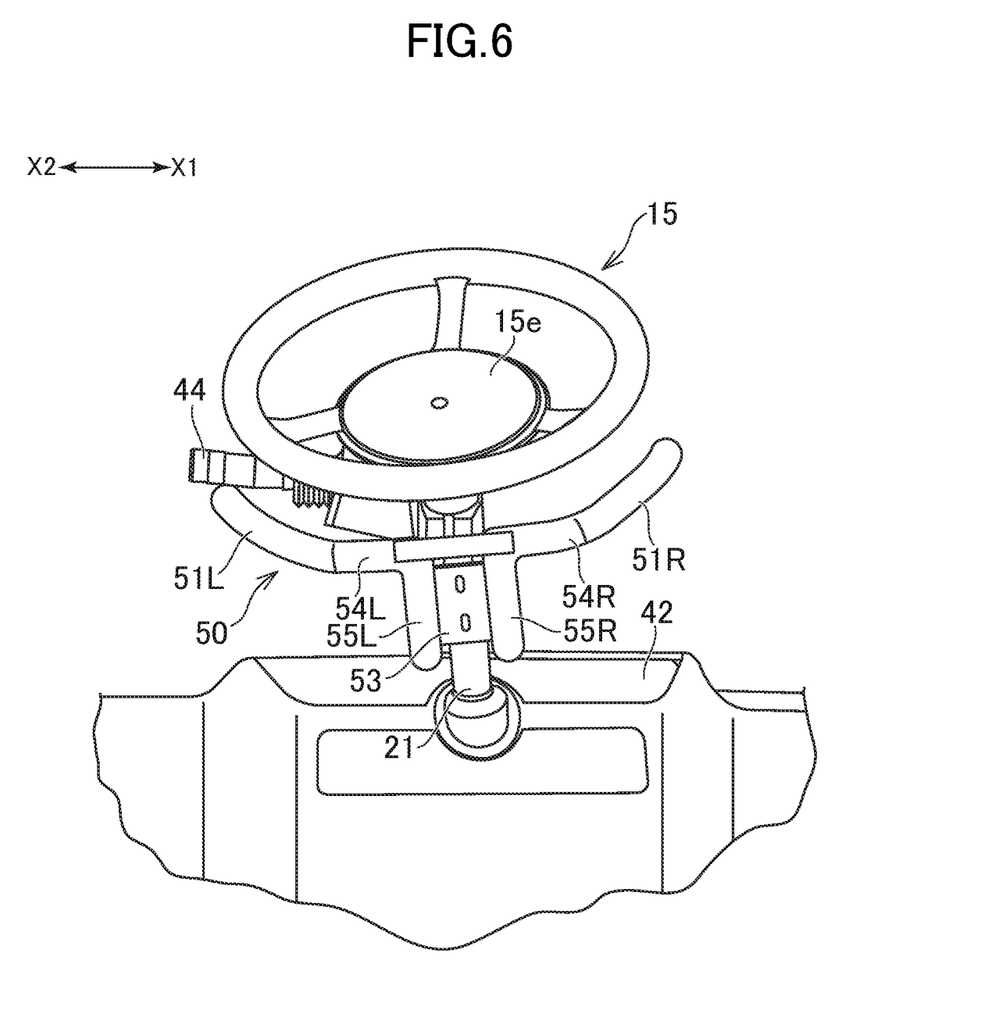
FIG. 6 is a perspective view showing the lower side of the steering wheel and the fixed member.

FIG. 1 is a side view of a vehicle 1 that is an example of embodiments according to this invention. FIG. 2 is a diagram showing a system configuration of the vehicle 1. FIG. 3 is a plan view of a region of the vehicle 1 in which a steering wheel 15 is located. FIG. 4 illustrates the steering wheel 15 and a fixed member 50 viewed in a direction along the rotation shaft of the steering wheel 15. FIG. 5 is a side view of the steering wheel 15 and the fixed member 50. FIG. 6 is a perspective view showing the lower side of the steering wheel 15 and the fixed member 50. In the following description, the directions of Y1 and Y2 shown in FIGS. 1 and 3 will be referred to as a front direction and a rear direction, respectively. Also, the directions of X1 and X2 shown in FIG. 3 are referred to as a right direction and a left direction.

As shown in FIG. 2, the vehicle 1 includes left and right front wheels 2 which are steered wheels, and right and left rear wheels 3 which are drive wheels. The vehicle 1 includes a vehicle drive motor 4 that is a drive source for driving the rear wheels 3. Instead of the example of the vehicle 1, the drive source may employ an engine. The vehicle 1 includes a battery 29, a controller 30, and a drive control circuit 32. When the vehicle 1 runs, the drive control circuit 32 receives electric power from the battery 29 and supplies electric power according to a command value output from the controller 30 to the vehicle drive motor 4. The vehicle 1 includes an accelerator pedal 9 for the driver to control the drive source of the vehicle 1. Further, the vehicle 1 includes an accelerator switch 9a and an accelerator position sensor 9b. The accelerator switch 9a outputs ON/OFF signals that indicate whether the accelerator pedal 9 is operated. That is, the accelerator switch 9a outputs ON/OFF signals that indicate whether the accelerator pedal 9 is depressed by the driver. The accelerator position sensor 9b outputs a signal corresponding to the operation amount. (depression amount) of the accelerator pedal 9. The controller 30 has a manual operation mode and an automatic operation mode as its control modes. In the manual operation mode, the controller 30 controls the vehicle drive motor 4 based on the output signal of the accelerator position sensor 9b. In the automatic operation mode, the controller 30 controls the vehicle drive motor 4 so that the vehicle speed follows the target vehicle speed.

As shown in FIG. 2, the vehicle 1 includes a steering wheel 15 operated by the driver for steering the front wheels 2. The steering wheel 15 is linked to the front wheels 2 via a rotation shaft 18 extending from the steering wheel 15 and a tie rod 19. The rotational position of the steering wheel 15 and the direction of the front wheels 2 correspond to each other. In the manual operation mode, the front wheels 2 are steered according to the operation by the driver of the steering wheel 15. The vehicle 1 has a steering actuator 17 for steering the front wheels 2 and a steering driver 35 for supplying driving electric power to the steering actuator 17. In the automatic operation mode, the steering actuator 17 is controlled by the controller 30, and the front wheels 2 are steered by the steering actuator 17. The steering actuator 17 drives at a speed corresponding to a command value output from the controller 30 to the steering driver 35.

In the automatic operation mode, the controller 30 controls the steering actuator 17 so that the vehicle 1 travels along an induction line buried in the ground of a traveling course, for example. Traveling courses are defined, for example, on public roads and golf courses. As shown in FIG. 2, the vehicle 1 includes a plurality of induction line sensors 16R, 16C, and 16L aligned in the left-right direction. Each induction line sensor 16R, 16C, 16L is positioned at the lower part of the vehicle body and outputs a signal corresponding to the relative position between the induction line sensors 16R, 16C, 16L and the induction line. The controller 30 controls the steering actuator 17 based on signals output from the induction line sensors 16R, 16C, 16L so that the vehicle 1 does not deviate from the traveling course. The vehicle 1 is not necessarily a vehicle traveling on the traveling course on which the induction line is laid. For example, the vehicle 1 may include a sensor for detecting a vehicle traveling in front of the vehicle 1. Then, the controller 30 may control the steering actuator 17 so that the vehicle 1 follows the vehicle traveling in front of it. In another example, the vehicle 1 may include a sensor for detecting a lane on a public road. Then, the controller 30 may control the steering actuator 17 so that the vehicle 1 travels within and along the lane.

The vehicle 1 includes a steering sensor 28. The steering sensor 28 outputs a signal indicating whether the steering wheel 15 is operated. The steering sensor 28 is, for example, a torque sensor that outputs a signal corresponding to the torque applied to the rotation shaft 18. The steering sensor 28 is not necessarily the torque sensor.

As shown in FIG. 1, the vehicle 1 includes front seats 41 and rear seats 43. The steering wheel 15 is positioned in front of the front seats 41. The rotation shaft 18 of the steering wheel 15 extends diagonally upward and rearward. The steering wheel 15 is fixed to the uppermost portion of the rotation shaft 18 and rotates integrally with the rotation shaft 18. In the example of the vehicle 1, a dashboard 42 is positioned in front of the front seat 41. The upper portion of the rotation shaft 18 projects obliquely upward and rearward from the dashboard 42. In the example of the vehicle 1, as shown in FIG. 3, the rotation shaft 18 of the steering wheel 15 is slightly inclined to the left. The arrangement of the rotation shaft 18 may be changed. For example, the rotation shaft 18 is not necessarily inclined to the left.

The vehicle 1 includes a fixed member 50. As shown in FIG. 4, the fixed member 50 includes grip portions 51R, 51L located adjacent to (in the vicinity of) the steering wheel 15. The grip portions 51R and 51L are bar-like portions. When the steering wheel 15 is viewed in a direction D1 (see FIG. 5) along the rotation shaft 18, the grip portions 51R and 51L extend from the lower side to the upper side of the steering wheel 15 (hereinafter, the direction D1 along the rotation shaft 18 is referred as to "rotation shaft direction"). In other words, each of the grip portions 51R, 51L includes one end located closer to a straight line L1 extending in the left-right direction and passing through the lower end 15a of the steering wheel 15, and extends from the one end toward a straight line L2 extending in the left-right direction and passing through the upper end 15b of the steering wheel 15. In still other words, when the steering wheel 15 is viewed in the rotation shaft direction D1 thereof, the upper ends 51c of the grip portions 51R and 51L are located closer to the straight line L2 than the lower ends 51a of the grip portions 51R and 51L, and the lower ends 51a of the grip portions 51R and 51L are located closer to the straight line L1 than the upper ends 51c of the grip portions 51R and 51L. The steering wheel 15 is rotatable independently of the fixed member 50. That is, the fixed member 50 does not rotate together with the steering wheel 15. As will be described, later, in the example of the vehicle 1, the fixed member 50 is attached to the rotation shaft holder 21 which supports the rotation shaft 18 of the steering wheel 15.

As mentioned above, while traveling in automatic operation mode, the front wheels 2 are steered by the controller 30 through the steering actuator 17. At this time, the rotation shaft 18 and the steering wheel 15 rotate in accordance with steering of the front wheels 2. On the other hand, the fixed member 50 do not rotate. Therefore, the driver can stabilize the driver's own posture by gripping the grip portions 51R, 51L of the fixed member 50 during the traveling in the automatic operation mode. The grip portions 51R and 51L are located in a vicinity of the steering wheel 15 and extend from the lower side toward the upper side of the steering wheel 15. Therefore, the driver can smoothly move the hands grasping the grip portions 51R, 51L to the steering wheel 15 to grasp the steering wheel 15, and can immediately react the shifting from the automatic operation mode to the manual operation mode. For example, when the acceleration switch 9a detects that the accelerator pedal 9 has been pedaled in the automatic operation mode, the controller 30 starts the manual operation mode. The controller 30 may start the manual operation mode when the steering sensor 28 detects that the steering wheel 15 is operated by the driver in the automatic operation mode.

As shown in FIG. 4, in the example of the vehicle 1, the fixed member 50 includes a right grip portion 51R and a left grip portion 51L. The right grip portion 51R is located further rightward than the rotation shaft 18 of the steering wheel 15. The left grip portion 51L is located further leftward than the rotation shaft 18 of the steering wheel 15. The driver is allowed to grasp the left grip portion 51L and the right grip portion 51R with the left and right hands, respectively. In the example of the vehicle 1, the fixed member 50 is symmetrical with respect to the straight line L4 extending in the front-rear direction and passing through the center C1 of the rotation shaft 18. Therefore, the right grip portion 51R and the left grip portion 51L are symmetrical with respect to the straight line L4.

As shown in FIGS. 1 and 5, the positions of the grip portions 51R, 51L in the rotation shaft direction D1 of the steering wheel 15 are closer to the front wheel 2 than that of the steering wheel 15 in a side view of the vehicle 1. In other words, the position of the grip portions 51R, 51L in the rotation shaft direction D1 of the steering wheel 15 is closer to the lower end 18a of the rotation shaft 18 of the steering wheel 15 than that of the steering wheel 15. This arrangement of the grip portions 51R, 51L prevents the grip portions 51R and 51L from interfering with the steering operation of the driver.

As shown in FIG. 5, the grip portions 51R and 51L are positioned along the steering wheel 15 in a side view of the steering wheel 15. In the example of the vehicle 1, the steering wheel 15 extends obliquely forward and upward in a side view. The grip portions 51R and 51L also extend obliquely forward and upward. This arrangement of the grip portions 51R and 51L enables the driver to smoothly move the hands holding the grip portions 51R, 51L to the steering wheel 15 to grasp the steering wheel 15. In the example of the vehicle 1, the grip portions 51R and 51L are parallel to the steering wheel 15 in a side view of the steering wheel 15. The description "the grip portions 51R and 51L are positioned along the steering wheel 15 in a side view of the steering wheel 15" covers an embodiment in which the grip portions 51R and 51L are inclined with respect to the steering wheel 15 though the grip portions 51R and 51L extend obliquely forward and upward like the steering wheel 15. Therefore, the grip portions 51R, 51L and the steering wheel 15 are not necessarily parallel.

The grip portions 51R, 51L are spaced apart from the steering wheel 15. This arrangement of the grip portions 51R, 51L prevents the grip portions 51R, 51L from interfering with the driver's steering operation in the manual operation mode. In the example of the vehicle 1, as shown in FIG. 5, the grip portions 51R and 51L are spaced apart from the steering wheel 15 in the rotation shaft direction D1 of the steering wheel 15. That is, in a side view of the steering wheel 15, the grip portions 51R, 51L and the steering wheel 15 have a space S2 formed therebetween. Unlike the example of the vehicle 1, the grip portions 51R and 51L may overlap the steering wheel 15 in a side view of the steering wheel 15. On the other hand, when the steering wheel 15 is viewed in the rotation shaft direction D1, the grip portions 51R, 51L and the steering wheel 15 may have spaces therebetween. This arrangement of the grip portions 51R and 51L also prevents the grip portions 51R and 51L from interfering with the driver's steering operation in the manual operation mode.

As shown in FIG. 4, when the steering wheel 15 is viewed in the rotation shaft direction D1, the grip portions 51R and 51L are arranged along the steering wheel 15. The steering wheel 15 is circular. When the steering wheel 15 is viewed in the rotation shaft direction D1, the grip portions 51R, 51L are curved along the steering wheel 15. This shape of the grip portions 51R, 51L allows the driver to move the hands grasping grip portions 51R, 51L to the steering wheel 15 more smoothly and then grasp the steering wheel 15. In the example of the vehicle 1, the grip portions 51R and 51L are curved along a portion of the steering wheel 15. More specifically, the grip portions 51R and 51L are curved along the lower half portion 15d of the steering wheel 15 (the "lower half portion 15d" is a portion located lower than a straight line L3 extending in the left-right direction and passing through the rotation center C1 of the steering wheel 15).

The description that "the right grip portion 51R is curved along the steering wheel 15" means that the right grip portion 51R extends upward and rightward while bending in the example of FIG. 4. Similarly, the description that "the left grip portion 51L is curved along the steering wheel 15" means that the left grip portion 51L extends upward and leftward while bending in the example of FIG. 4. The grip portions 51R and 51L may not be circular arcs having the same center C1 as the steering wheel 15. In addition, the grip portions 51R and 51L are not necessarily curved as a whole. For example, a portion of the right grip portion 51R may linearly extend and the other portion may be curved along the steering wheel 15. Likewise, a portion of the left grip portion 51L may linearly extend and the other portion may be curved along the steering wheel 15. In addition, the grip portions 51R and 51L may be bent at their intermediate positions.

As shown in FIG. 4, the grip portions 51R and 51L have a portion located outward of the steering wheel 15 in the radial direction when the steering wheel 15 is viewed in the rotation shaft direction D1. This enables the driver to more easily find the positions of the grip portions 51R, 51L and to grasp the grip portions 51R, 51L smoothly. In the example of the vehicle 1, the inner portions (the portions indicated by a broken line in FIG. 4) of the grip portions 51R, 51L overlap with the steering wheel 15, and the outer portions 51b of the grip portions 51R and 51L are located outward of the steering wheel 15 in the radial direction. Unlike the example of the vehicle 1, the entire grip portions 51R, 51L may be located outward of the steering wheel 15 in the radial direction. That is, when the steering wheel 15 is viewed in the rotation shaft direction D1, the grip portions 51R and 51L may not overlap with the steering wheel 15. In other words, when the steering wheel 15 is viewed in the rotation shaft direction D1, the grip portions 51R, 51L and the steering wheel 15 may have spaces therebetween.

As shown in FIG. 4, the right grip portion 51R and the left grip portion 51L are spaced apart from each other in the left-right direction. The lower end portion 51a of the right grip portion 51R and the lower end portion 51a of the left grip portion 51L have a space S1 formed therebetween when the steering wheel 15 is viewed in the rotation shaft direction D1. The arrangement of the grip portions 51R, 51L prevents the grip portions 51R, 51L from interfering with the driver sitting on the front seat 41. In the example of the vehicle 1, the steering wheel 15 has a center portion 15e formed like a disk and fixed to the uppermost part of the rotation shaft 18. The lower end portion 51a of the right grip portion 51R is positioned further rightward than the outer peripheral edge of the center portion 15e. The lower end portion 51a of the left grip portion 51L is located further leftward than the outer peripheral edge of the central portion 15e. Unlike the example of the vehicle 1, the lower end portions 51a of the grip portions 51R and 51L may be positioned closer to the rotation center C1 of the rotation shaft 18 than the outer peripheral edge of the central portion 15e. In another example, the lower end portion 51a of the right grip portion 51R and the lower end portion 51a of the left grip portion 51L may be connected to each other. That is, the grip portion 51 may include a portion located along the lower portion of the steering wheel 15 and connecting the right grip portion 51R and the left grip portion 51L.

As described above, in the example of the vehicle 1, the steering wheel 15 is substantially circular when the steering wheel 15 is viewed in the rotation shaft direction D1. Unlike the example of the vehicle 1, the steering wheel 15 may include a portion extending linearly. For example, the lower portion of the steering wheel 15 may extend linearly in the left-right direction ("the lower portion" means a portion that is located between the lower end 51a of the right grip portion 51R and the lower end 51a of the left grip portion 51L when the steering wheel 15 is viewed in the rotation shaft direction D1).

As shown in FIG. 4, the vehicle 1 includes an operating lever 44 operated by a driver. The operating lever 44 is supported by a support mechanism 44a (see FIG. 5) adjacent to the rotation shaft 18 of the steering wheel 15 and extends outwardly from the support mechanism 44a in the radial direction of the steering wheel 15. The operating lever 44 is, for example, for turning on and turning off the flashers 46 (see FIG. 1). The grip portions 51R, 51L do not intersect with the operating lever 44 when the steering wheel 15 is viewed in the rotation shaft direction D1. This arrangement of the grip portions 51R, 51L prevent the grip portions 51R, 51L from obstructing the operation of the operating lever 44 by the driver. In the example of the vehicle 1, the operating lever 44 extends in the left direction. When the steering wheel 15 is viewed in the rotation shaft direction D1, the left grip portion 51L is located below the operating lever 44. That is, the left grip portion 51L is located closer to the straight line L1 than the operating lever 44. The vehicle 1 may include an operating lever extending in the right direction. In this case, when the steering wheel 15 is viewed in the rotation shaft direction D1, the right grip portion 51R may be located closer to the straight line L1 than the operating lever.

As shown in FIG. 5, the vehicle 1 includes a rotation shaft holder 21 that rotatably supports the rotation shaft 18 of the steering wheel 15. In the example of the vehicle 1, the rotation shaft holder 21 has tubular shape, and the rotation shaft 18 is positioned inside the rotation shaft holder 21. The fixed member 50 is attached to the rotation shaft holder 21, and the position of the fixed member 50 is fixed. This structure of the fixed member 50 can secure a large enough distance between the fixed member 50 and the driver's leg to prevent the fixed member 50 from hindering the driver.

As shown in FIG. 6, in the example of the vehicle 1, the fixed member 50 includes an attached portion 53 positioned closer to the rotation shaft 18 of the steering wheel 15 than the grip portions 51R and 51L. The attached portion 53 is arranged along the rotation shaft holder 21. In a side view of the steering wheel 15 and the rotation shaft 18, the attached portion 53 is located under the rotation shaft holder 21. The attached portion 53 is attached to a bracket 21a (see FIG. 5) fixed to the outer surface of the rotation shaft holder 21 by fixing members such as screws and bolts.

The fixing structure of the fixed member 50 is not limited to the example of the vehicle 1. For example, the attached portion 53 may be positioned on the upper side of the rotation shaft holder 21 in a side view of the steering wheel 15 and rotation shaft 18, and may be fixed to the rotation shaft holder 21. In still another example, the attached portion 53 may be positioned on the right side or the left side of the rotation shaft holder 21 and may be fixed to the rotation shaft holder 21. In another example, the fixed member 50 may be attached to a different member (for example, the dashboard 42) than the rotation shaft holder 21. In another example, the position of the fixed member 50 may be adjustable. That is, the position of the fixed member 50 may be movable by a predefined range. For example, the position of the fixed member 50 may be adjustable in the rotation shaft direction D1 of the steering wheel 15 or in the circumferential direction of the steering wheel 15.

As shown in FIGS. 4 and 5, in the example of the vehicle 1, the fixed member 50 includes first extending portions 54R, 54L extending from the lower end portions 51a of the left and right grip portions 51R and 51L toward the rotation shaft 18, second extending portions 55R, 55L that are bent from the first extending portions 54R, 54L to extend from the first extending portions 54R, 54L along the rotation shaft 18. The attached portion 53 is fixed to the left and right second extending portions 55R, 55L. This shape of the fixed member 50 can prevent the extending portions 54R, 54L, 55R, 55L and the attached portion 53 from interfering with the driver.

The right grip portion 51R and the right extending portions 54R, 55R are constituted by, for example, one pipe. Further, the left grip portion 51L and the left extending portions 54L, 55L are constituted by, for example, one pipe. The fixed member 50 is not limited to the example in the vehicle 1. For example, the right grip portion 51R, the right first extending portion 54R, and the right second extending portion 55R may be constituted by a plurality of members fixed to each other by welding or fixing members (for example, screws or bolts). Further, the left grip portion 51L, the left first extending portion 54L, and the left second expending portion 55L may be constituted by a plurality of members fixed to each other by welding or fixing members (for example, screws or bolts). In another example, the fixed member 50 may not include the second extending portions 55R, 55L.

As described above, in the example of the vehicle 1, the fixed member 50 includes the grip portions 51R, 51L located in a vicinity of the steering wheel 15. When the steering wheel 15 is viewed in the direction D1 (see FIG. 5) along the rotation shaft 18, the grip portions 51R and 51L extend from the lower side to the upper side of the steering wheel 15. Also, the steering wheel 15 is rotatable independently of the fixed member 50. That is, the fixed member 50 does not rotate integrally with the steering wheel 15. According to this structure, the driver can grasp the grip portions 51R, 51L of the fixed member 50 to stabilize the posture of the driver while the vehicle 1 is traveling in the automatic operation mode. Further, the driver can move the hand grasping the grip portions 51R and 51L to the steering wheel 15 to grasp the steering wheel 15 smoothly.

The present invention is not limited to the above-described vehicle 1, and various modifications may be made.

Figure 7:
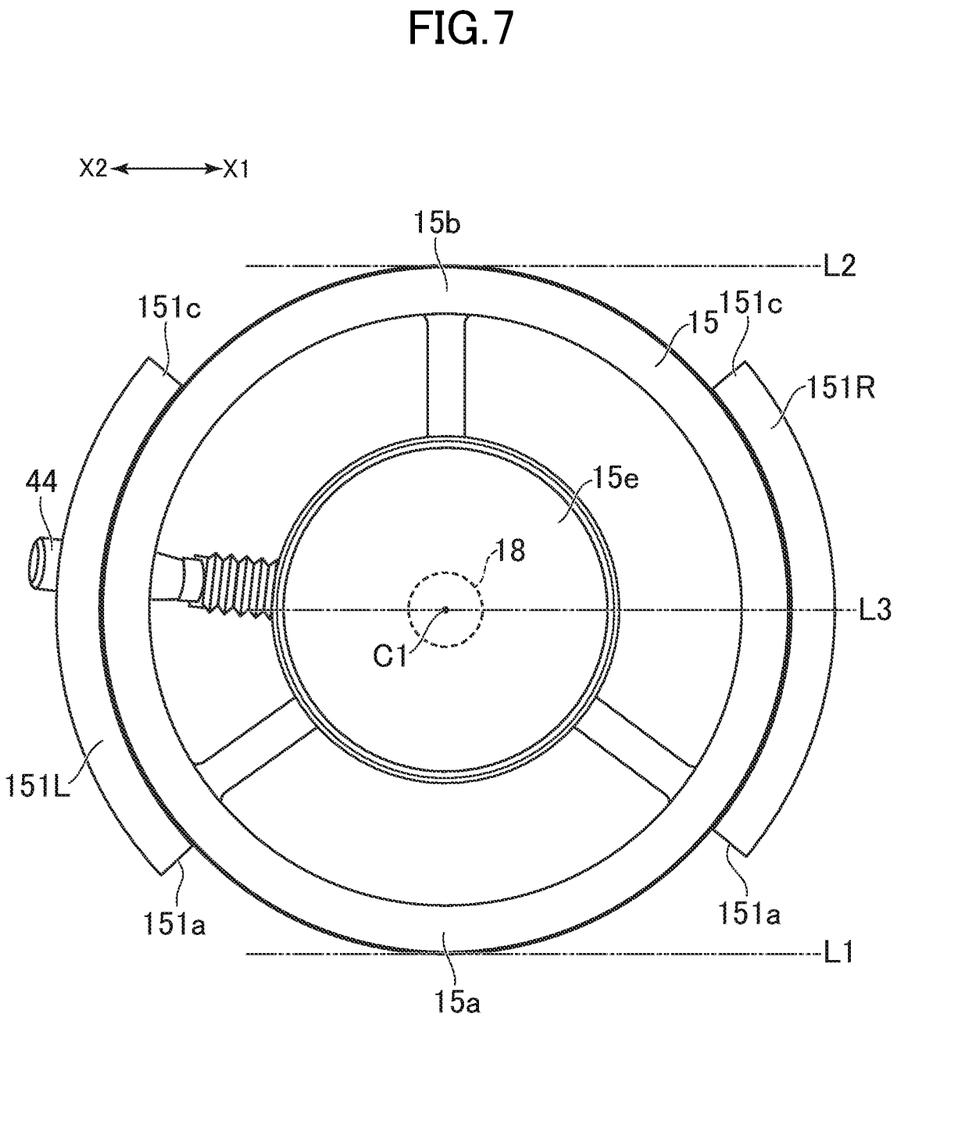
FIG. 7 is a view showing a modified example of the grip portion included in the fixed member.
Figure 8:
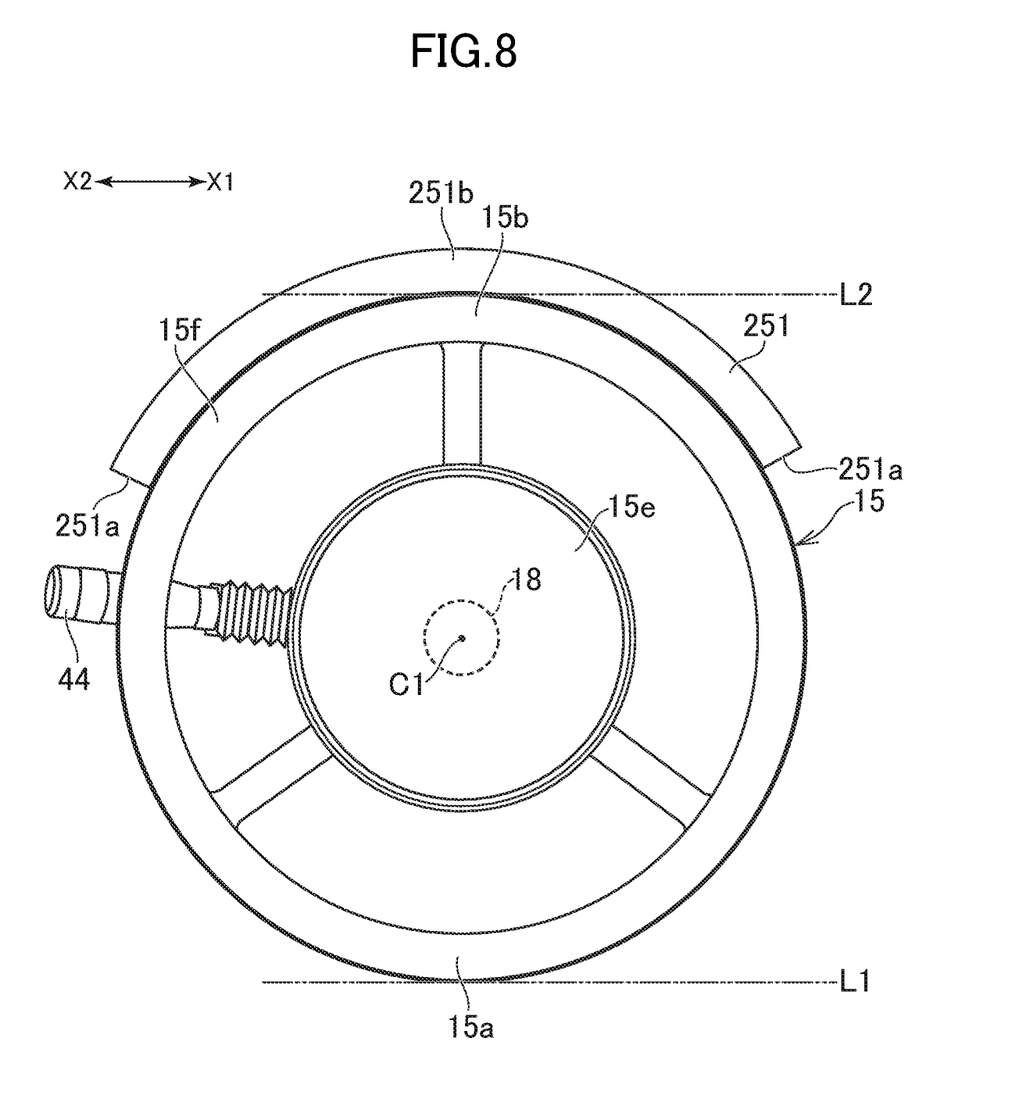
FIG. 8 is a view showing another modified example of the grip portion included in the fixed member.
Figure 9:
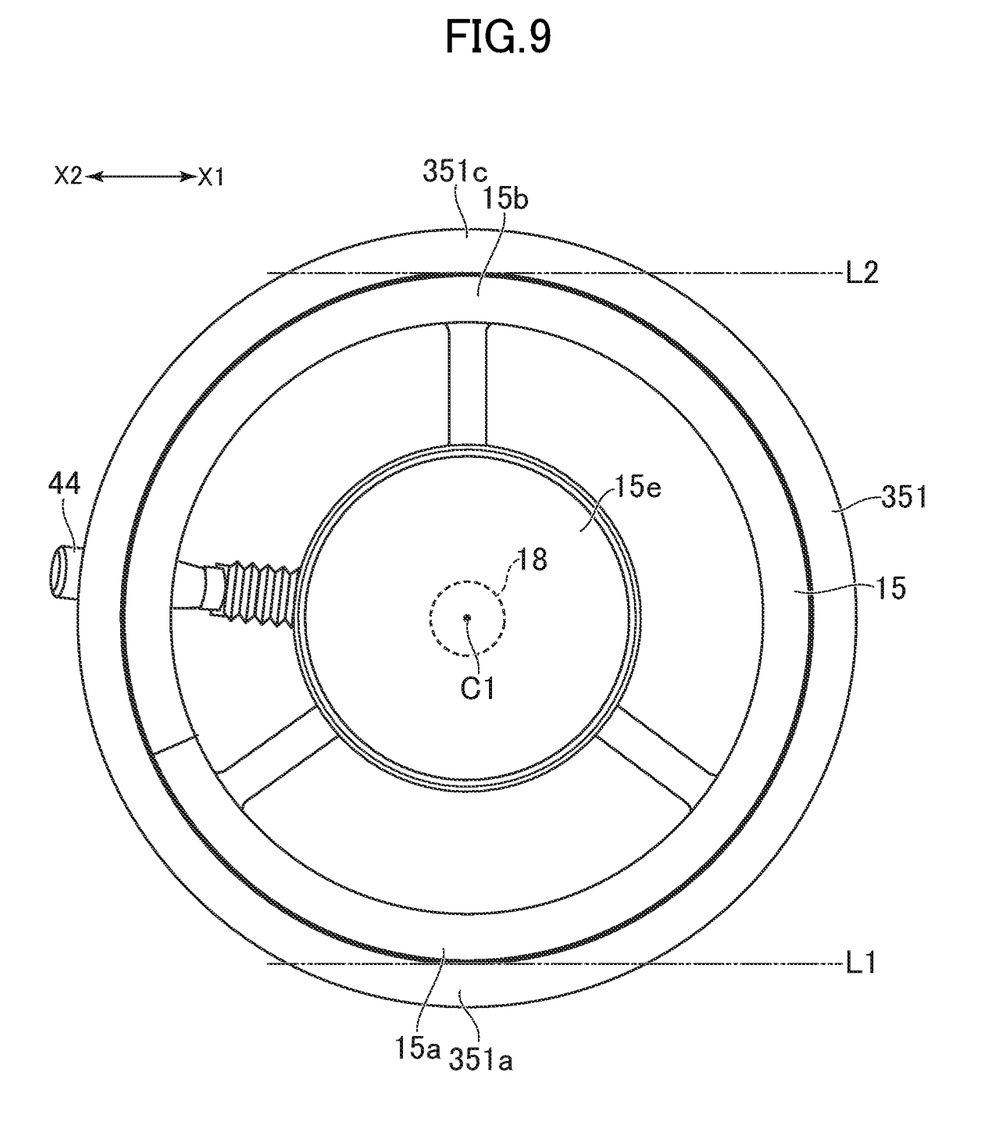
FIG. 9 is a view showing still another modified example of the grip portion of the fixed member.

FIGS. 7, 8, and 9 are diagrams showing modifications of the grip portions 51R and 51L. FIG. 7 shows grip portions 151R, 151L as a modified example. FIG. 8 shows a grip portion 251 as a modified example. FIG. 9 shows a grip portion 351 as a modified example. With respect to these modifications, features different from the grip portions 51R and 51L will be mainly described below. The structures and features that are not described in the following description are the same as those of the grip portions 51R and 51L.

The fixing member shown in FIG. 7 includes a right grip portion 151R and a left grip portion 151L that are spaced apart from each other in the left-right direction. When the steering wheel 15 is viewed in the rotation shaft direction D1, the grip portions 151R and 151L intersect with the straight line L3 passing through the rotation center C1 of the steering wheel 15 and extending in the left-right direction. That is, each grip portion 151R, 151L includes a portion located above the straight line L3 and a portion located below the straight line L3. The arrangement of the grip portions 151R and 151L enables the grip portions 151R and 151L to have sufficient lengths and can increase the degree of freedom for the position at which the driver grasps the grip portions 151R and 151L. In the example shown in FIG. 7, the grip portions 151R and 151L extend from the lower side to the upper side of the steering wheel 15 similarly to the grip portions 51R and 51L. That is, the grip portions 151R and 151L extend from the end portion 151a closer to the straight line L1 passing through the lower end 15a of the steering wheel 15 toward the straight line L2 passing through the upper end 15b of the steering wheel 15. In still other words, when the steering wheel 15 is viewed in the rotation shaft direction D1 thereof, the upper ends 151c of the grip portions 151R and 151L are located closer to the straight line L2 than the lower ends 151a of the grip portions 151R and 151L, and the lower ends 151a of the grip portions 151R and 151L are located closer to the straight line L1 than the upper ends 151c of the grip portions 151R and 151L. In addition, the grip portions 151R and 151L are separated from each other in the left-right direction.

The grip portion 251 shown in FIG. 8 is curved along the upper portion 15f of the steering wheel 15 when the steering wheel 15 is viewed in the rotation shaft direction D1. This arrangement of the grip portion 251 effectively prevents the grip portion 251 from interfering with the driver, since it increases the distance between the grip portion 251 and the driver's legs. In the example of FIG. 8, unlike the grip portions 51R and 51L, the grip portion 251 is not divided into the right portion and the left portion thereof. Therefore, the driver is allowed to grasp the uppermost portion 251b of the grip portion 251. Also, the grip portion 251 does not intersect with the operating lever 44 when the steering wheel 15 is viewed in the rotation shaft direction D1. In the example of FIG. 8, the attached portion 53 that attaches the fixed member 50 to the rotation shaft holder 21 may be positioned on the upper side of the rotation shaft holder 21 in a side view of the steering wheel 15 and the rotation shaft 18. The grip portion 251 includes a portion extending from end portions 251a closer to the straight line L1 passing through the lower end 15a of the steering wheel 15 toward the straight line L2 passing through the upper end 15b of the steering wheel 15. In other words, the grip portion 251 includes a portion extending from the lower side to the upper side of the steering wheel 15. In still other words, when the steering wheel 15 is viewed in the rotation shaft direction D1 thereof, the upper end 251b of the grip portion 251 is located closer to the straight line L2 than the lower end 251a of the grip portion 251, and the lower end 251a of the grip portion 251 is located closer to the straight line L1 than the upper end 251b of the grip portion 251.

As shown in FIG. 9, when the steering wheel 15 is viewed in the rotation shaft direction D1, the grip portion 351 is formed around the entire circumference around the rotation center C1 of the steering wheel 15. That is, the grip portion 351 has an annular shape. This shape of the grip portion 351 can further increase the degree of freedom for the position where the driver grasps. The grip portion 351 also extends from an end portion 351a closer to the straight line L1 passing through the lower end 15a of the steering wheel 15 toward the straight line L2 passing through the upper end 15b of the steering wheel 15. In other words, the grip portion 351 includes a portion extending from the lower side to the upper side of the steering wheel 15. In still other words, when the steering wheel 15 is viewed in the rotation shaft direction D1 thereof, the upper end 351c of the grip portion 351 is located closer to the straight line L2 than the lower end 351a of the grip portion 351, and the lower end 351a of the grip portion 351 is located closer to the straight line L1 than the upper end 351c of the grip portion 351.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A vehicle comprising:
a front wheel;
a rear wheel;
a steering wheel rotatable around an axis defined by a rotation shaft and operated by a driver for steering the front wheel;
a controller having, as control modes thereof, an automatic operation mode in which the front wheel is steered with an actuator and a manual operation mode in which the front wheel is steered according to the operation of the steering wheel by the driver; and
a fixed member comprising a grip portion located adjacent to the steering wheel, wherein
the steering wheel is rotatable independently of the fixed member,
at least a part of the grip portion extends from a position adjacent to a lower side of the steering wheel toward an upper side of the steering wheel when the steering wheel is viewed in the direction along the rotation shaft,
a support mechanism adjacent to the rotation shaft of the steering wheel; and
an operating lever supported by the support mechanism and extending from the support mechanism in a radial direction of the steering wheel wherein
the grip portion does not intersect with the operating lever when the steering wheel is viewed in the direction along the rotation shaft of the steering wheel.

2. The vehicle according to claim 1, wherein
the part of the grip portion is curved along the steering wheel.

3. The vehicle according to claim 1, wherein
at least the part of the grip portion is partially or entirely located outward of the steering wheel in a radial direction of the steering wheel when the steering wheel is viewed in the direction along the rotation shaft.

4. The vehicle according to claim 1, wherein
in a side view of the vehicle, the position of the grip portion in the direction along the rotation shaft is closer to the front wheel than that of the steering wheel.

5. The vehicle according to claim 1, wherein
the grip portion and the steering wheel have a space formed therebetween.

6. The vehicle according to claim 1, wherein
the fixed member is attached to a holder that rotatably supports the rotation shaft of the steering wheel.

7. The vehicle according to claim 1, wherein
the fixed member comprises, as the grip portion, a right grip portion located further rightward than the rotation shaft of the steering wheel and a left grip portion located further leftward than the rotation shaft of the steering wheel, and
when the steering wheel is viewed in the direction along the rotation shaft, a lower end of the right grip portion and a lower end of the left grip portion have a space formed therebetween.

8. The vehicle according to claim 1, wherein
in the automatic operation mode, the steering wheel rotates according to steering of the front wheel.

* * * * *